(12) United States Patent
Jang (10) Patent No.: US 11,990,053 B2
(45) Date of Patent: May 21, 2024

(54) METHOD AND SYSTEM FOR PROVIDING ARTIFICIAL INTELLIGENCE-BASED EXTENDED REALITY MUSIC TUTORING SERVICE (71) Applicant: Emotionwave Inc., Yongin-si (KR)

(72) Inventor: Soonchul Jang, Yongin-si (KR)

(73) Assignee: EMOTIONWAVE INC., Yongin-si (KR)

( * ) Notice: Subject to any disclaimer, the term of this patent is extended or adjusted under 35 U.S.C. 154(b) by 360 days.

(21) Appl. No.: 17/543,561

(22) Filed: Dec. 6, 2021

(65) Prior Publication Data
US 2022/0254270 A1 Aug. 11, 2022

(30) Foreign Application Priority Data
Feb. 5, 2021 (KR) .......................... 10-2021-0016887

(51) Int. Cl.
G09B 15/00 (2006.01)
G06F 3/01 (2006.01)
G06N 20/00 (2019.01)
G09B 5/02 (2006.01)

(52) U.S. Cl.
CPC .............. *G09B 15/00* (2013.01); *G06F 3/011* (2013.01); *G06N 20/00* (2019.01); *G09B 5/02* (2013.01)

(58) Field of Classification Search
CPC .......... G09B 15/00; G06N 20/00; G06F 3/011
See application file for complete search history.

(56) References Cited

U.S. PATENT DOCUMENTS

2020/0365047 A1* 11/2020 Grande ................. G09B 5/065
2021/0104169 A1* 4/2021 Si ............................ G06T 11/00
2022/0254270 A1* 8/2022 Jang ......................... G09B 5/02

FOREIGN PATENT DOCUMENTS

| KR | 10-1808452 B1 | 12/2017 |
| KR | 102258234 B1 * | 8/2023 |
| KR | 102623431 B1 * | 8/2023 |

* cited by examiner

Primary Examiner — Robert W Horn
(74) Attorney, Agent, or Firm — STIP Law Group, LLC (57) ABSTRACT There is provided a method for providing an artificial intelligence-based extended reality music tutoring service by a system including one or more learner devices, one or more tutor devices, and a server, the method including matching, by the server, a learner device and a tutor device for performing extended reality music tutoring, based on learner information transmitted from the one or more learner devices and tutor information transmitted from the one or more tutor devices, integrating, by the server, learner environment information transmitted from the matched learner device and tutor environment information transmitted from the matched tutor device, generating, by the server, real-time lesson data for tutors based on real-time learner data transmitted from the learner device, rendering, by the tutor device, an extended reality image about the learner device interacting with the tutor device on a display of the tutor device, by using the generated real-time lesson data for the tutor, generating, by the server, real-time lesson data for learners based on real-time tutor data transmitted from the tutor device, and rendering, by the learner device, an extended reality image about the tutor device interacting with the learner device on a display of the learner device, by using the generated real-time lesson data for the learner.

10 Claims, 8 Drawing Sheets

METHOD AND SYSTEM FOR PROVIDING ARTIFICIAL INTELLIGENCE-BASED EXTENDED REALITY MUSIC TUTORING SERVICE

CROSS-REFERENCE TO RELATED APPLICATION

This application claims priority to Korean Patent Application No. 10-2021-0016887 filed on Feb. 5, 2021, and all the benefits accruing therefrom under 35 U.S.C. § 119, the contents of which are incorporated by reference in their entirety.

BACKGROUND

The present disclosure relates to a method and system for providing an artificial intelligence-based extended reality music tutoring service.

With the recent growing interest in art culture and growing demand for hobbies to enjoy such art culture, the demand for music tutoring through public or private education is rapidly increasing.

However, in the case of music tutoring, which is currently generally implemented, there are spatial constraints in providing music education to a large number of people at the same time, and in addition to that, there is a limitation that not only the physical infrastructure such as musical instruments and teaching aids is insufficient, but also the human infrastructure that is able to provide professional education for various musical instruments is insufficient.

Furthermore, it is difficult for learners to find the best expert who is able to provide tailored music tutoring in the way that they want, and it is difficult for experts to find the most suitable learner for the music education that they are able to provide, and in these regards, there is a limitation that a satisfactory tutoring experience for both learners and experts are not easily provided.

Meanwhile, with the development of extended reality technology encompassing virtual reality, augmented reality, and mixed reality, telepresence technology may be implemented, and attempts are being made to provide a non-face-to-face imaging solution by applying such telepresence technology to various fields.

SUMMARY

The present disclosure has been made in order to overcome the limitations described above, and provides a method and system for providing an artificial intelligence-based extended reality music tutoring service, capable of resolving spatial constraints, lack of physical infrastructure, and lack of human infrastructure by providing a non-face-to-face music tutoring service in an environment close to the real face-to-face education environment through providing a music tutoring service using extended reality technology.

In addition, the present disclosure also provides a tailored music tutoring service to a learner and a tutor by matching an optimal tutor who is able to provide a music tutoring that the learner wants, and matching an optimal learner suitable for the music tutoring that the tutor is able to provide.

In accordance with an exemplary embodiment of the present disclosure, there is provided a method for providing an artificial intelligence-based extended reality music tutoring service by a system including one or more learner devices, one or more tutor devices, and a server, the method including matching, by the server, a learner device and a tutor device for performing extended reality music tutoring, based on learner information transmitted from the one or more learner devices and tutor information transmitted from the one or more tutor devices, integrating, by the server, learner environment information transmitted from the matched learner device and tutor environment information transmitted from the matched tutor device, generating, by the server, real-time lesson data for tutors based on real-time learner data transmitted from the learner device, rendering, by the tutor device, an extended reality image about the learner device interacting with the tutor device on a display of the tutor device, by using the generated real-time lesson data for the tutor, generating, by the server, real-time lesson data for learners based on real-time tutor data transmitted from the tutor device, and rendering, by the learner device, an extended reality image about the tutor device interacting with the learner device on a display of the learner device, by using the generated real-time lesson data for the learner.

DETAILED DESCRIPTION OF EMBODIMENTS

Hereinafter, exemplary embodiments according to the present disclosure will be described in detail with reference to the drawings. The following description is only for specifying the exemplary embodiments, and is not intended to restrict or limit the scope of rights according to the present disclosure. Therefore, what could be easily conceived by those skilled in the field upon reading the detailed description and exemplary embodiments of the present disclosure is to be construed as falling within the scope of the present disclosure.

Hereinafter, exemplary embodiments according to the present disclosure will be described in detail with reference to the drawings. Detailed description of matters widely known to those skilled in the art of the present disclosure will be omitted.

First, in the present disclosure, extended reality (XR) may be defined as referring to a hyper-realistic technologies and services, encompassing virtual reality (VR), augmented reality (AR) and mixed reality (MR) technologies.

In addition, in the present disclosure, a learner may be defined as referring to any person who wishes to learn to play a musical instrument, and a tutor may be defined as referring to any person who has the ability to play a musical instrument capable of providing lessons to the learner, such as a professional player, a music teacher, and the like.

Figure 1:
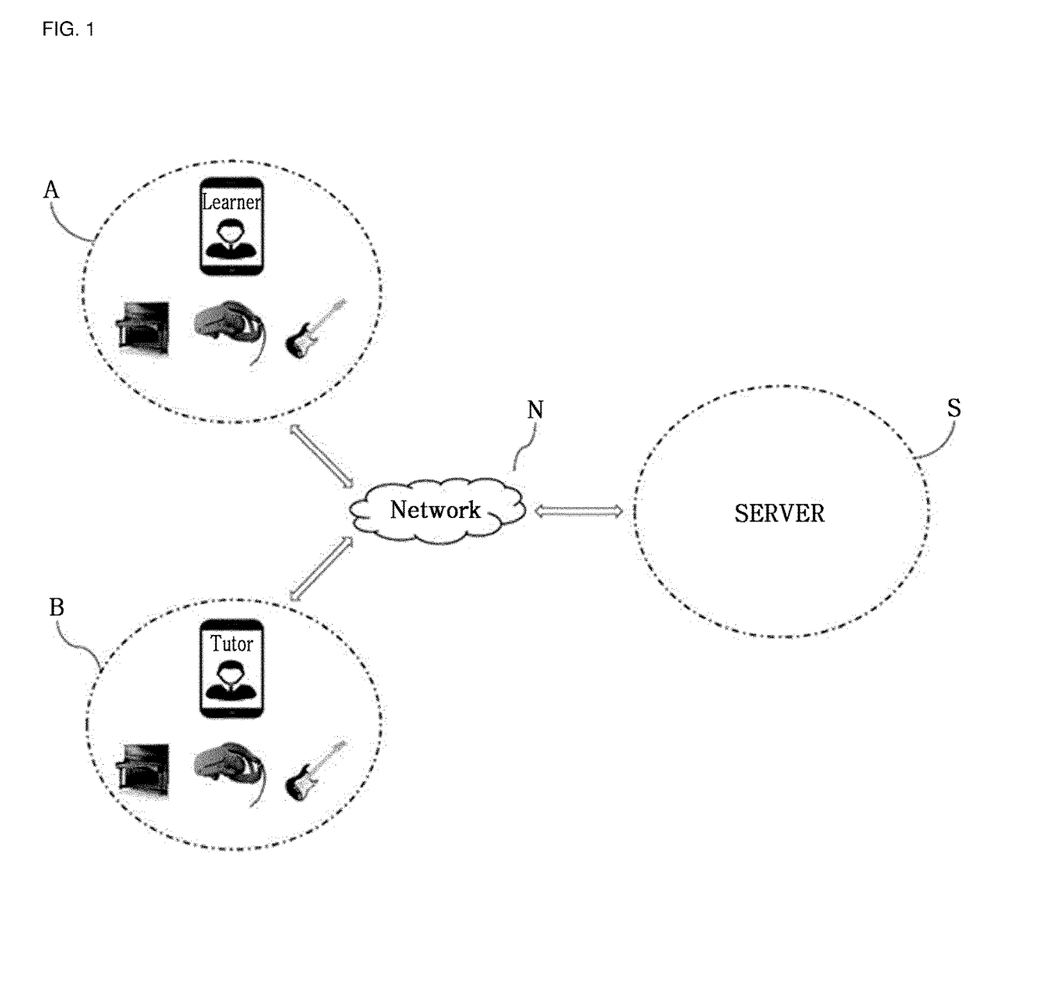
FIG. 1 illustrates a diagram of a system for providing an artificial intelligence-based extended reality music tutoring service in accordance with some exemplary embodiments of the present disclosure.

FIG. 1 illustrates a diagram of a system for providing an artificial intelligence-based extended reality music tutoring service in accordance with some exemplary embodiments of the present disclosure.

The system for providing the extended reality music tutoring service in accordance with some exemplary embodiments of the present disclosure may include a server S that is accessible to a network N through wired or wireless communication, stores information, and communicates with a learner device A and a tutor device B, the learner device A that is accessible to the network N through wired or wireless communication and transmits and receives information to and from the server S, and the tutor device B that is accessible to the network N through wired or wireless communication and transmits and receives information to and from the server S. In this case, as necessary, one or more learner devices A and one or more tutor devices B may be connected to the server S.

Figure 2:
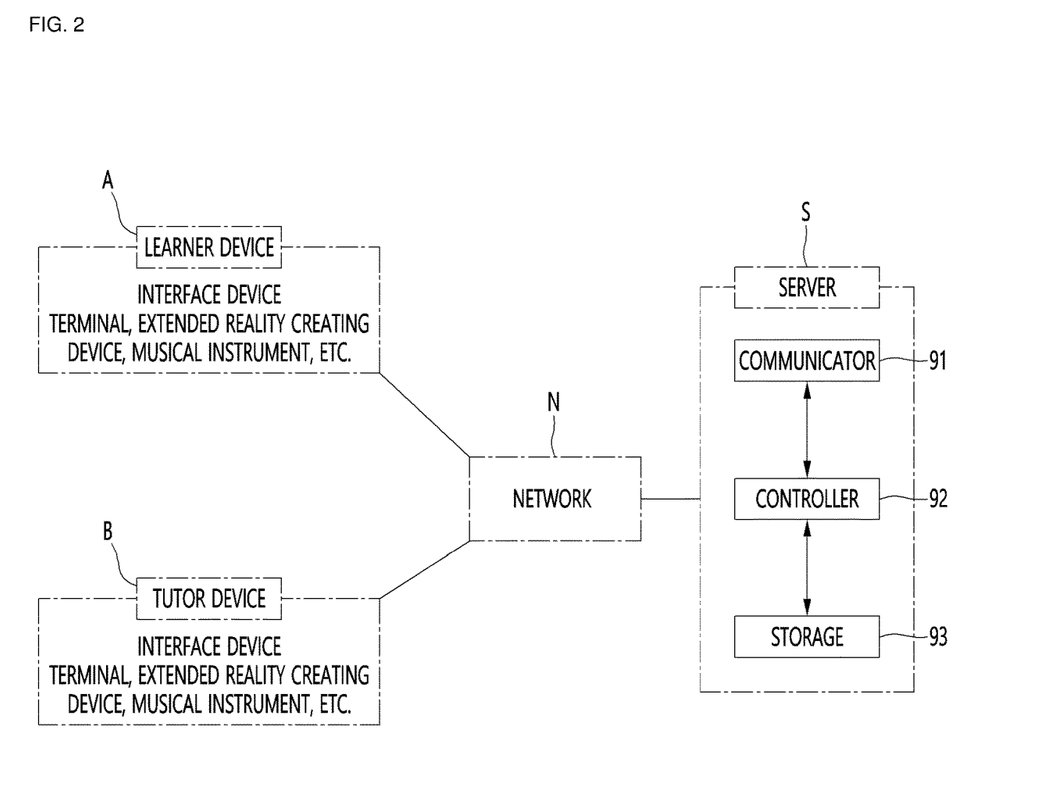
FIG. 2 illustrates a diagram of a detailed construction of a system for providing an artificial intelligence-based extended reality music tutoring service in accordance with some exemplary embodiments of the present disclosure.

FIG. 2 illustrates a diagram of a detailed construction of a system for providing an artificial intelligence-based extended reality music tutoring service in accordance with some exemplary embodiments of the present disclosure. The terms including "unit", "~er(or)", or the like described hereinafter refer to units of performing at least one function or operation, which may be implemented by hardware or software, or a combination of hardware and software.

Referring to FIG. 2, the server S includes a communicator 91, a controller 92, and a storage 93. More specifically, the communicator 91 may provide an interface for performing communication with other devices in the system, and may transmit and receive information with the learner device A and the tutor device B. In addition, the controller 92 controls the overall operations of the server S. For example, the controller 92 controls operations of the server S, which will be described later in detail, such as matching the learner device A and the tutor device B, generating avatar images of users of the learner device A and the tutor device B, processing voices to be transmitted to the learner device A and the tutor device B, generating data that causes the learner device A and the tutor device B to render an extended reality image, and analyzing a performance pattern of a learner using the learner device A. To this end, the controller 92 may be implemented by an array of a plurality of logic gates or a general-purpose microprocessor. The controller 92 may include at least one processor. In addition, the storage 93 stores data such as a basic program for the operation of the server S, an application program, and setting information. The storage 93 may be a volatile memory, a non-volatile memory, or a combination of a volatile memory and a non-volatile memory. In addition, the storage 93 provides the stored data in response to a request of the controller 92.

Furthermore, referring to FIG. 2, the learner device A and the tutor device B are each a concept including a terminal, an extended reality generating device (VR/AR/MR device, motion detection device, audio, or the like) and an input device (microphone, musical instrument, or the like).

In addition, the learner device A and the tutor device B may further include a body tracking device, and the motion detected through the tracking device may be implemented as an image through a virtual avatar (learner avatar, tutor avatar, or the like).

Further, the terminal may refer to any unit including a device capable of transmitting a signal through a wired or wireless Internet network. That is, the terminal corresponds to a device for accessing the Internet, and broadly, may include an input device, such as keyboard and mouse, for inputting various data, an output device such as a monitor and printer, a transceiver such as a modem or LAN, a processing device such as a microprocessor or graphic card, and a storage equipped with various programs for operating or controlling them. Examples of such a terminal may include a personal communication system (PCS) terminal, a global system for mobile communications (GSM) terminal, a personal digital cellular (PDC) terminal, a personal handy-phone system (PHS) terminal, a personal digital assistant (PDA), a smart phone, telematics, a wireless data communication terminal and/or portable Internet terminal, a personal computer, a laptop computer, and the like.

Figure 3:
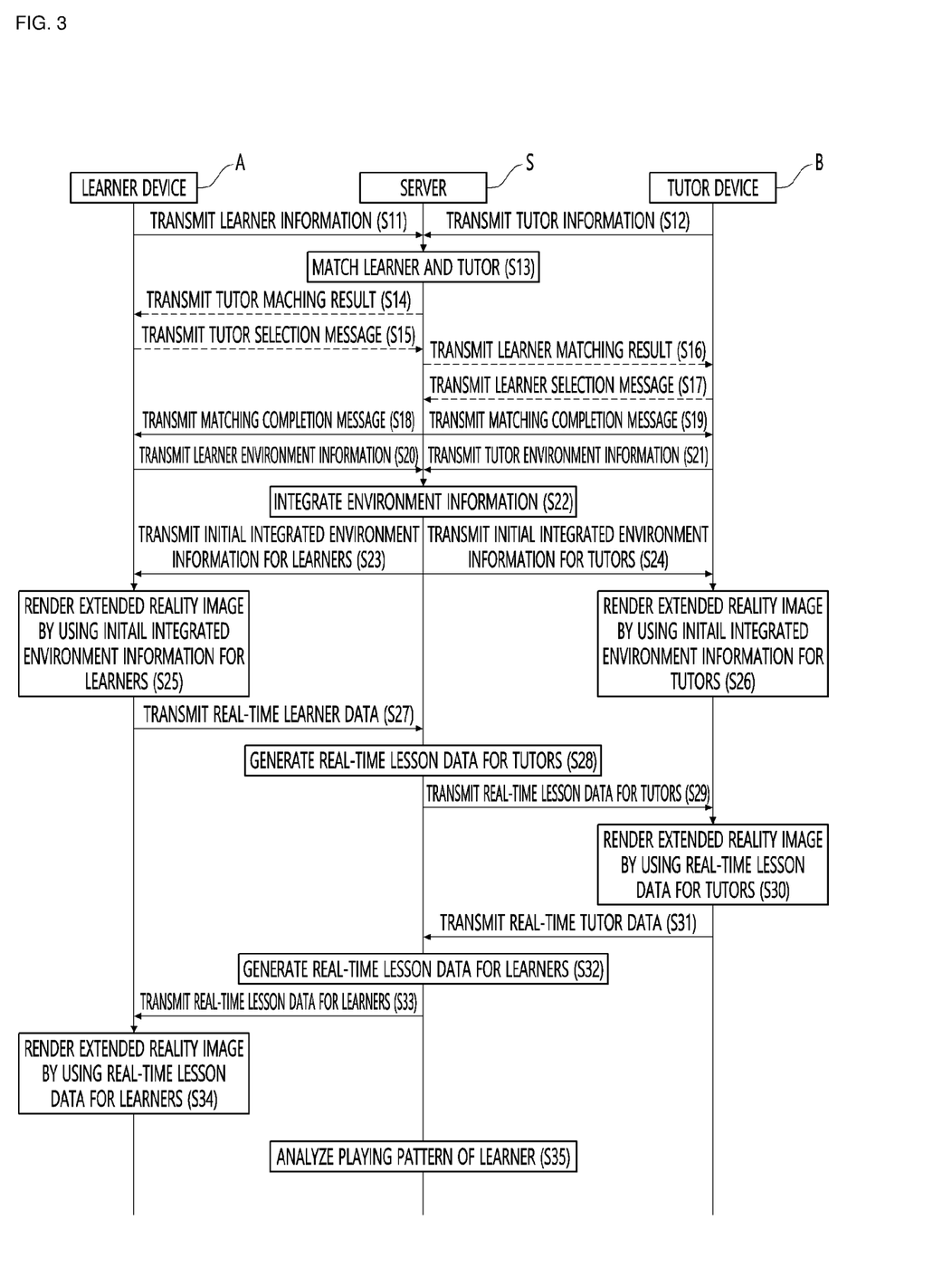
FIG. 3 shows a flowchart for providing a music tutoring service by a system for providing an artificial intelligence-based extended reality music tutoring service in accordance with some exemplary embodiments of the present disclosure.

FIG. 3 shows a flowchart for providing a music tutoring service by a system for providing an artificial intelligence-based extended reality music tutoring service in accordance with some exemplary embodiments of the present disclosure. FIG. 3 illustrates a flowchart regarding signal exchange between the learner device A, the server S, and the tutor device B.

Figure 4A:
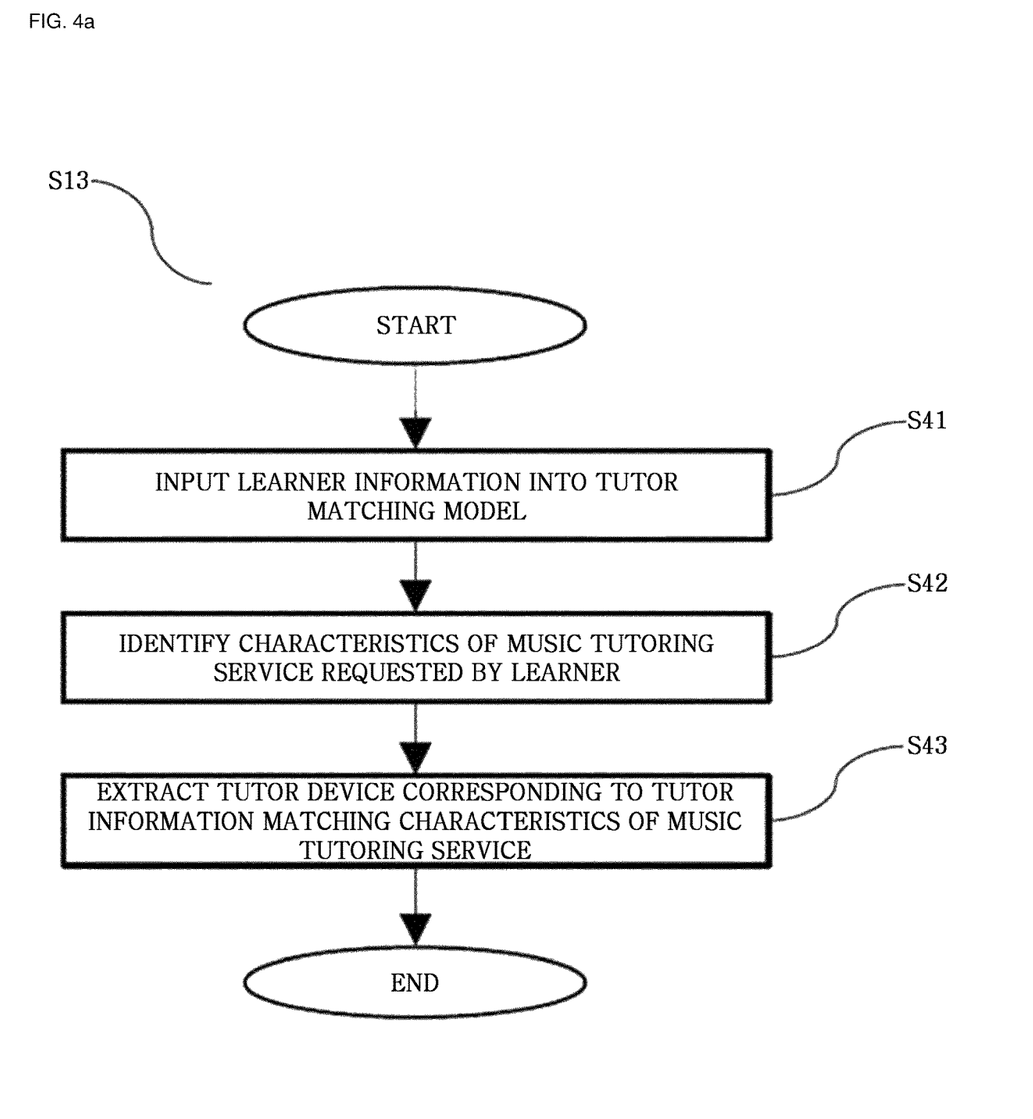
FIGS. 4a and 4b show detailed flowcharts of a step of matching a learner and a tutor based on artificial intelligence by a system in accordance with some exemplary embodiments of the present disclosure.
Figure 4B:
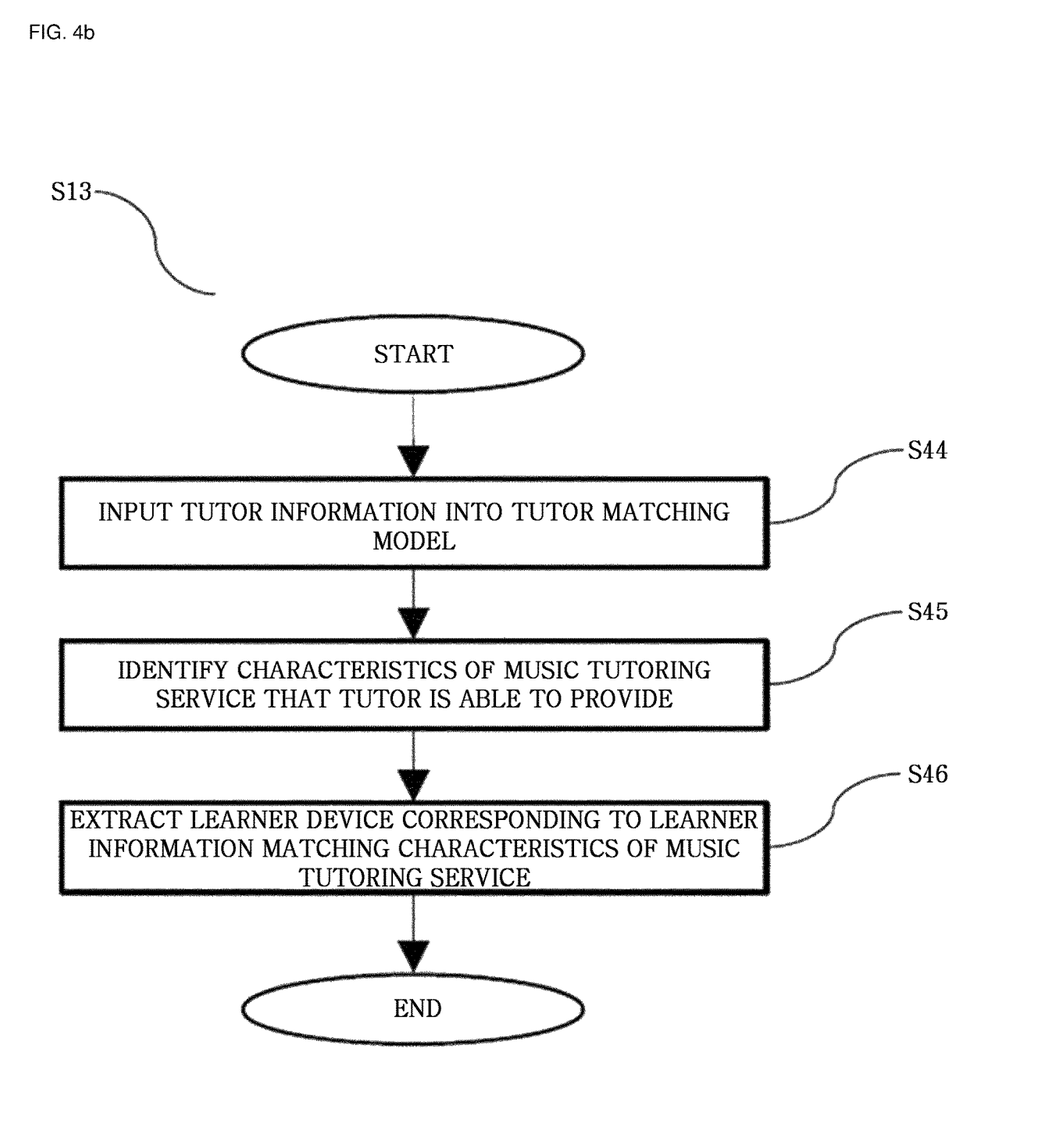

Referring to FIG. 3, in step S11, the learner device A may transmit learner information to the server S. Further, in step S12, the tutor device B may transmit tutor information to the server S. Further, in step S13, the server S may match the learner device A and the tutor device B for performing extended reality music tutoring, based on learner information transmitted from the one or more learner devices and tutor information transmitted from the one or more tutor devices. In this case, as will be described later with reference to FIG. 4, the matching may be performed using data analysis and modeling based on artificial intelligence (AI). In addition, although not shown in FIG. 3, the server S may perform step S13 by receiving a matching request from the learner device A, or may perform step S13 by receiving a matching request from the tutor device B.

In this case, the learner information may include information on a music genre (e.g., classical music, jazz, and popular music) for which a learner wants to receive tutoring, information on a musical instrument (e.g., piano, guitar, and violin) for which the learner wants to receive tutoring, information on a musical instrument playing level (e.g., beginner, intermediate, advanced) of the learner, information on a tutoring method preferred by the learner and information on tutoring time (e.g., one-to-one learning, one-to-many learning, long lesson, and short lesson), and information on a tutoring purpose (e.g., mastering one song perfectly, building up skills from the basics, and repeating past lessons) of the learner. In addition, the tutor information may include information on a music genre (e.g., classical music, jazz, and popular music) in which a tutor offers tutoring, information on a musical instrument (e.g., piano, guitar, and violin) in which the tutor offers tutoring, information on a performance level (e.g., beginner, intermediate, advanced) of a past tutoring target, information on a past tutoring method and information on past tutoring time (e.g., one-to-one learning, one-to-many learning, long lesson, and short lesson), and information on a past tutoring purpose (e.g., mastering only one song perfectly, building up skills from the basics, and repeating past lessons). Additionally, the tutor information may include information on a music genre in which a tutor wants to offer tutoring, information on a musical instrument, information on a performance level of a tutoring target, information on a tutoring method, information on tutoring time, and information on a tutoring purpose.

In this way, it is possible to match the optimal tutor considering various factors, such as the level of the learner and a preferred music genre preferred by the learner, a tutoring method, a purpose, or the like, based on artificial intelligence, and it is also possible to match the learner most suitable for the tutor by considering the past tutoring history of the tutor. In addition, in some exemplary embodiments of the present disclosure, it is possible to perform one-to-many tutoring by a plurality of learner devices selecting the same tutor device.

In step S14, the server S may transmit a tutor matching result indicating the matched tutor device B to the learner device A. In addition, the learner device A may determine to receive extended reality music tutoring from the tutor device B included in the tutor matching result, and in step S15, may transmit, to the server S, a tutor selection message indicating that the tutor device B has been selected. In this case, the tutor matching result may include information on at least one tutor device.

In step S16, the server S may transmit a learner matching result indicating the matched learner device A to the tutor device B. In addition, the tutor device B may determine to provide extended reality music tutoring to the learner device A included in the learner matching result, and in step S17, may transmit, to the server S, a learner selection message indicating that the learner device A has been selected. In this case, the learner matching result may include information on at least one learner device.

In this case, steps S14 and S15 and steps S16 and S17 may be selectively performed. Specifically, when the optimal tutor is proposed to the learner device A in step S13, steps S14 and S15 may be performed, and when the optimal learner is proposed to the tutor device B in step S13, steps S16 and S17 may be performed.

Further, in step S18, the server S may transmit, to the matched learner device A, a matching completion message indicating that the matching has been completed, and also in step S19, may transmit, to the matched tutor device B, the matching completion message.

In step S20, the learner device A may transmit learner environment information to the server S. Here, the learner environment information may include background information about a first space where the learner is located, location information about the learner in the first space, and location and shape information about a musical instrument to be played by the learner in the first space. For example, when the learner is in his/her own room and wants to receive piano tutoring, the learner environment information may include background information on the size, shape, arrangement of furniture, or the like, of the room, location information about the learner in the room, and specific shape information such as the location of the piano in the room and a piano keyboard.

In step S21, the tutor device B may transmit tutor environment information to the server S. In this case, the tutor environment information may include background information about a second space where the tutor is located, location information about the tutor in the second space, and location and shape information about a musical instrument to be played by the tutor in the second space, and may be exemplified as the learner environment information described above.

In step S22, the server S may integrate the learner environment information and the tutor environment information. In step S22, the server S may generate initial integrated environment information for learners and initial integrated environment information for tutors based on the integrating of the learner environment information and the tutor environment information.

In this case, the initial integrated environment information for learners may include first space-related information to which the tutor environment information is applied based on a tutor avatar image and the learner environment information, and the initial integrated environment information for tutors may include second space-related information to which the learner environment information is applied based on a learner avatar image and the tutor environment information. For example, the initial integrated environment information for learners may be initial information obtained by mixing the learner environment information and the tutor environment information to express an image in which the tutor avatar interacts with a piano placed in the room of the learner, and the initial integrated environment information for tutors may also be understood as a similar concept. Alternatively, the initial integrated environment information for learners may be information obtained by applying the learner environment information to a virtual studio, and the initial integrated environment information for tutors may be information obtained by applying the tutor environment information to the virtual studio. In this case, the learner device A and the tutor device B to be described below may be constructed to display an extended reality image in which the learner avatar and the tutor avatar exist in the same virtual studio.

In step S23, the server S may transmit the initial integrated environment information for learners to the learner device A, and in step S24, may transmit the initial integrated environment information for tutors to the tutor device B.

In step S25, the learner device A may render the extended reality image including the tutor avatar on a display of the learner device by using the initial integrated environment information for learners. For example, an image in which the tutor avatar exists in a space with the background of the room in which the learner is currently located may be produced on a display of an extended reality generating device worn by the learner.

In step S26, the tutor device B may render the extended reality image including the learner avatar on a display of the tutor device by using the initial integrated environment information for tutors.

In step S27, the learner device A may transmit real-time learner data to the server S. In this case, the real-time learner data may include voice data input in real time through the learner device, behavior data of the learner, and state data of a musical instrument played by the learner.

In step S28, the server S may generate real-time lesson data for tutors based on the real-time learner data. More specifically, the server S may generate data for expressing an extended reality image in which the learner avatar interacts in real time with a musical instrument played by the tutor in a space where the tutor is located by matching the real-time learner data to the tutor environment information.

Further, in step S29, the server S may transmit the real-time lesson data for tutors to the tutor device B, and in step S30, the tutor device B may render an extended reality image about the learner device A interacting with the tutor device B on the display of the tutor device B by using the real-time lesson data for tutors. More specifically, the tutor device B may render an extended reality image in which the learner avatar interacts in real time with a musical instrument played by the tutor, on the display of the tutor device. In this way, the tutor may watch the learner avatar playing the piano of the tutor in his/her room through the extended reality image produced on the display of the tutor device.

Further, in step S31, the tutor device B may transmit real-time tutor data to the server S. In this case, the real-time tutor data may include voice data input in real time through the tutor device, behavior data of the tutor, and state data of a musical instrument played by the tutor.

In step S32, the server S may generate real-time lesson data for learners based on the real-time tutor data. More specifically, the server S may generate data for expressing an extended reality image in which the tutor avatar interacts in real time with a musical instrument played by the learner in a space where the learner is located by matching the real-time tutor data to the learner environment information.

In step S33, the server S may transmit the real-time lesson data for learners to the learner device A, and in step S34, the learner device A may render an extended reality image about the tutor device B interacting with the learner device A on the display of the learner device A by using the real-time lesson data for learners. More specifically, the learner device A may render an extended reality image in which the tutor avatar interacts in real time with a musical instrument played by the learner, on the display of the learner device. In this way, the learner may watch the tutor avatar demonstrating the piano of the learner in his/her room through the extended reality image produced on the display of the learner device.

Meanwhile, steps S27 to S34 have been described sequentially for convenience of explanation, and steps S27 to S30 and S31 to S34 may be performed in parallel depending on the time at which each of the real-time learner data and the real-time tutor data arrives at the server S.

Additionally, in step S35, the server S may analyze a playing pattern of the learner based on the data in steps S27 to S34 described above. Specifically, deficiencies in the performance ability of the learner may be analyzed, and accordingly, the server S may additionally consider factors for supplementing the deficiencies when matching the learner and the tutor in step S13 later. In this way, a tutor capable of providing feedback to improve a the ability of the learner may be matched.

The learner avatar and tutor avatar described above may be implemented as volumetric images by the extended reality generating devices (e.g., at least one of VR glasses, MR glasses, or AR glasses) worn by the tutor and the learner, respectively, and the extended reality generating device may be included in the tutor device and the learner device as described above.

By the method for providing the artificial intelligence-based extended reality music tutoring service as described above, a real-time performance of a player (learner or tutor) connected remotely may be implemented by interworking with a musical instrument in the site where the other person is located. In addition, a non-face-to-face music tutoring service by telepresence technology may be provided by implementing the performance of the performer in the form of an extended reality image at the site where the other person is located. In some exemplary embodiments of the present disclosure, the musical instrument may include a musical instrument played directly by a player, a musical instrument playable by artificial intelligence, or a virtual musical instrument implemented in extended reality, but is not limited to the above examples.

FIGS. 4a and 4b show detailed flowcharts of step S13 of matching a learner and a tutor based on artificial intelligence by a system in accordance with some exemplary embodiments of the present disclosure. FIG. 4a may illustrate a case in which the server S receives a matching request from the learner device A, and FIG. 4b may illustrate a case in which the server S receives a matching request from the tutor device B.

First, referring to FIG. 4a, in step S41, the server S may input, into a tutor matching model, learner information about the learner device A that has transmitted the matching request. Further, in step S42, the server S may identify characteristics of a music tutoring service requested by the learner of the learner device A, from the learner information input to the tutor matching model. That is, the server S may identify characteristics such as the level of the learner and the music genre preferred by the learner, the tutoring method, and the purpose. Further, in step S43, the server S may extract, among one or more tutor devices connected to the server S, the tutor device B corresponding to tutor information matching the characteristics of the identified music tutoring service, based on the tutor matching model.

Referring to FIG. 4b, in step S44, the server S may input, into the tutor matching model, tutor information about the tutor device B that has transmitted the matching request. Further, in step S45, the server S may identify characteristics of the music tutoring service that the tutor of the tutor device B is able to provide from the tutor information input to the tutor matching model. That is, the server S may identify at least one of characteristics related to a past tutoring history of the tutor or characteristics related to the tutoring that the tutor wants to provide. Further, in step S46, the server S may extract, among one or more learner devices connected to the server S, the learner device A corresponding to learner information matching the characteristics of the identified music tutoring service, based on the tutor matching model.

In addition, matching of the learner and the tutor in accordance with some exemplary embodiments of the present disclosure may be performed by artificial intelligence, and the tutor matching model used for matching may be modeled by learning such as machine learning. More specifically, the server S may generate the tutor matching model by receiving information on the performance levels of learners for each musical instrument, analyzing the performance levels of the learners, and modeling characteristics of the tutor corresponding to the performance level of each of the learners, and through learning, the accuracy of the tutor matching model may be further improved. In this case, the server S may generate, based on the tutor matching model, an artificial intelligence tutor model having the characteristics of the tutor corresponding to the performance level of each learner, and may store the artificial intelligence tutor model.

In this case, the artificial intelligence tutor model may build database by classifying established music that is open to the public by genre, tendency, harmony, rhythm, time signature, year, composer, lyricist, arranger, or lyrics, that is, by attribute, and then may store a data set generated by learning the database for each attribute. In addition, the artificial intelligence tutor model may perform music tutoring through the extended reality image by making voice utterances in the form of text to speech (TTS). In addition, the artificial intelligence tutor model may provide learner-specific music tutoring by learning various educational courses according to the learner information about the matched learner.

Meanwhile, although not shown in FIGS. 3 and 4a, when the learner device A transmits the matching request to the server S in step S11, the learner device A may request matching with the artificial intelligence tutor other than the tutor devices connected to the server S. More specifically, when matching with the artificial intelligence tutor is requested, the server S may generate a model of the artificial intelligence tutor matching the learner device A based on the tutor matching model, or may call a stored model of the artificial intelligence tutor. While music tutoring using such an artificial intelligence tutor is performed, the artificial intelligence tutor may be produced in the form of an avatar by the extended reality generating device of the learner device A. That is, as described above, like music tutoring by the tutor using the tutor device, the avatar of the artificial intelligence tutor may also be produced in conjunction with the space where the learner is located.

When music tutoring by the artificial intelligence tutor is performed, the real-time performance data of the learner of the learner device A is input, and thus a part where the learner makes a high frequency of mistakes may be automatically identified by the artificial intelligence tutor. Accordingly, the artificial intelligence tutor may analyze the tendency of the learner's mistakes and suggest the learner to correct the playing method. The correction suggestion may be provided as an image in which a virtual musical instrument is played in the extended reality generating device of the learner device A, or provided as an image in which the avatar of the artificial intelligence tutor plays in a corrected method.

In addition, the artificial intelligence tutor may recommend the next song to be played or practiced to the learner by suggesting the correction of the playing method to the learner and then analyzing the level of growth through the practice of the learner. In addition, the artificial intelligence tutor may recommend that the learner practices a song about a preferred music genre, which may be identified by the learner information. Furthermore, the artificial intelligence tutor may recommend an ensemble with the identified learner to the learner device A by identifying a learner having a level similar to that of the learner of the learner device A among learners using the learner devices connected to the server S. Further, the artificial intelligence tutor may suggest, to the learner, an ensemble with the artificial intelligence tutor by generating music and phrases corresponding to the performance level of the learner (e.g., rhythm, accompaniment, harmony, and the like).

Figure 5:
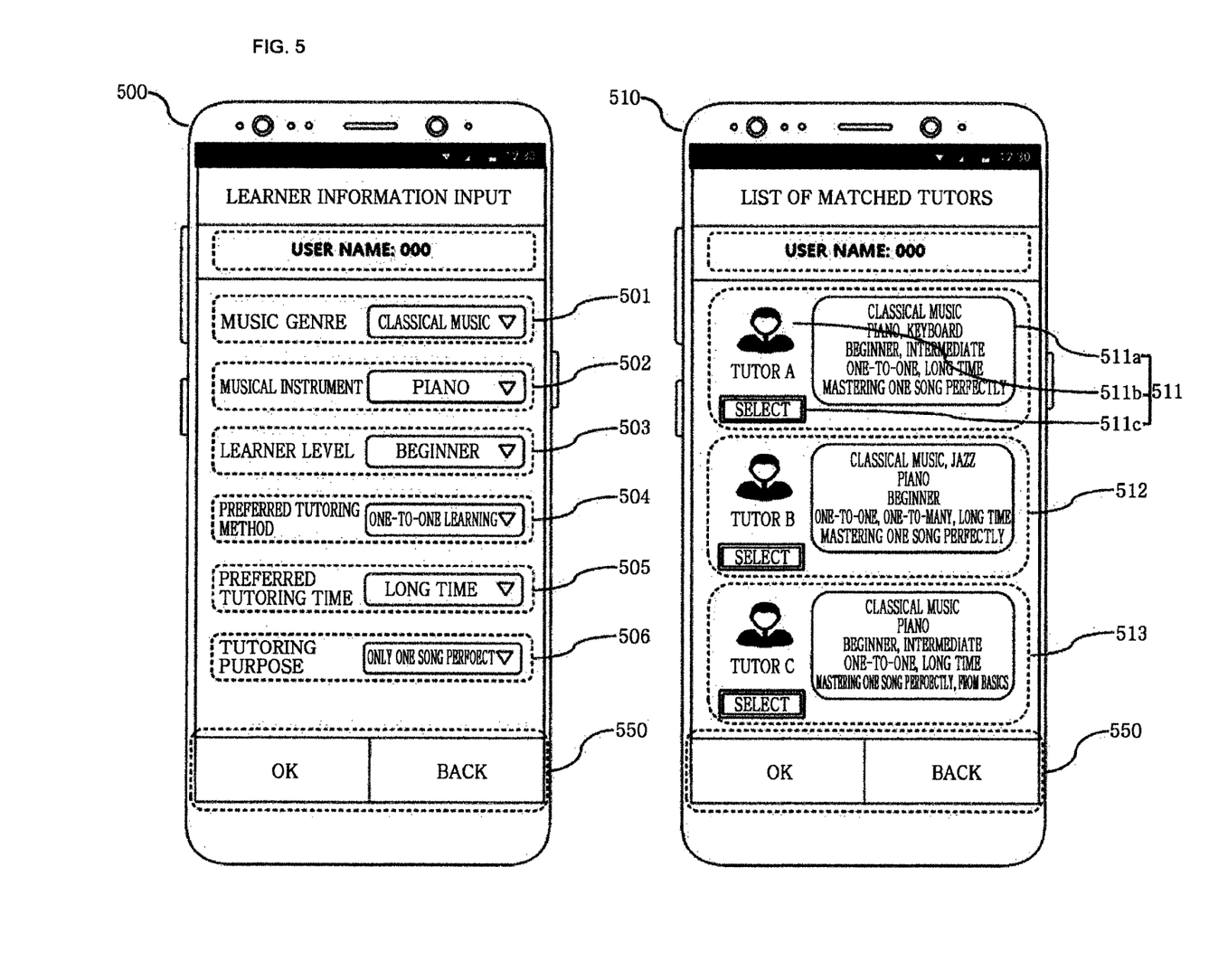
FIG. 5 illustrates a diagram of a learner information input page and a tutor selection page provided to a learner device in a system for providing an artificial intelligence-based extended reality music tutoring service in accordance with some exemplary embodiments of the present disclosure.

FIG. 5 illustrates a diagram of a learner information input page 500 and a tutor selection page 510 provided to a learner device in a system for providing an artificial intelligence-based extended reality music tutoring service in accordance with some exemplary embodiments of the present disclosure.

Specifically, the learner information input page 500 may be provided in step S11. The learner information input page 500 may include areas regarding items as described in FIG. 3, that is, an area 501 for inputting the information on the music genre in which the learner wants to receive tutoring, an area 502 for inputting the information on the musical instrument, an area 503 for inputting the information on the musical instrument performance level of the learner, an area 504 for inputting the information on the preferred tutoring method of the learner, an area 505 for inputting the information on the preferred tutoring time of the learner, and an area 506 for inputting the tutoring purpose of the learner.

Further, the tutor selection page 510 may be provided in step S14. For example, the tutor selection page 510 may include an area 511 for displaying information about the matched tutor, and the area 511 may include an area 511a for displaying information on tutoring that the tutor is able to provide, an area 511b for displaying an avatar or photo of the corresponding tutor, and a selection area 511c for selecting the corresponding tutor. Further, when a plurality of tutors are matched, the tutor selection page 510 may further include areas 512 and 513 for displaying information about the tutor.

Figure 6:
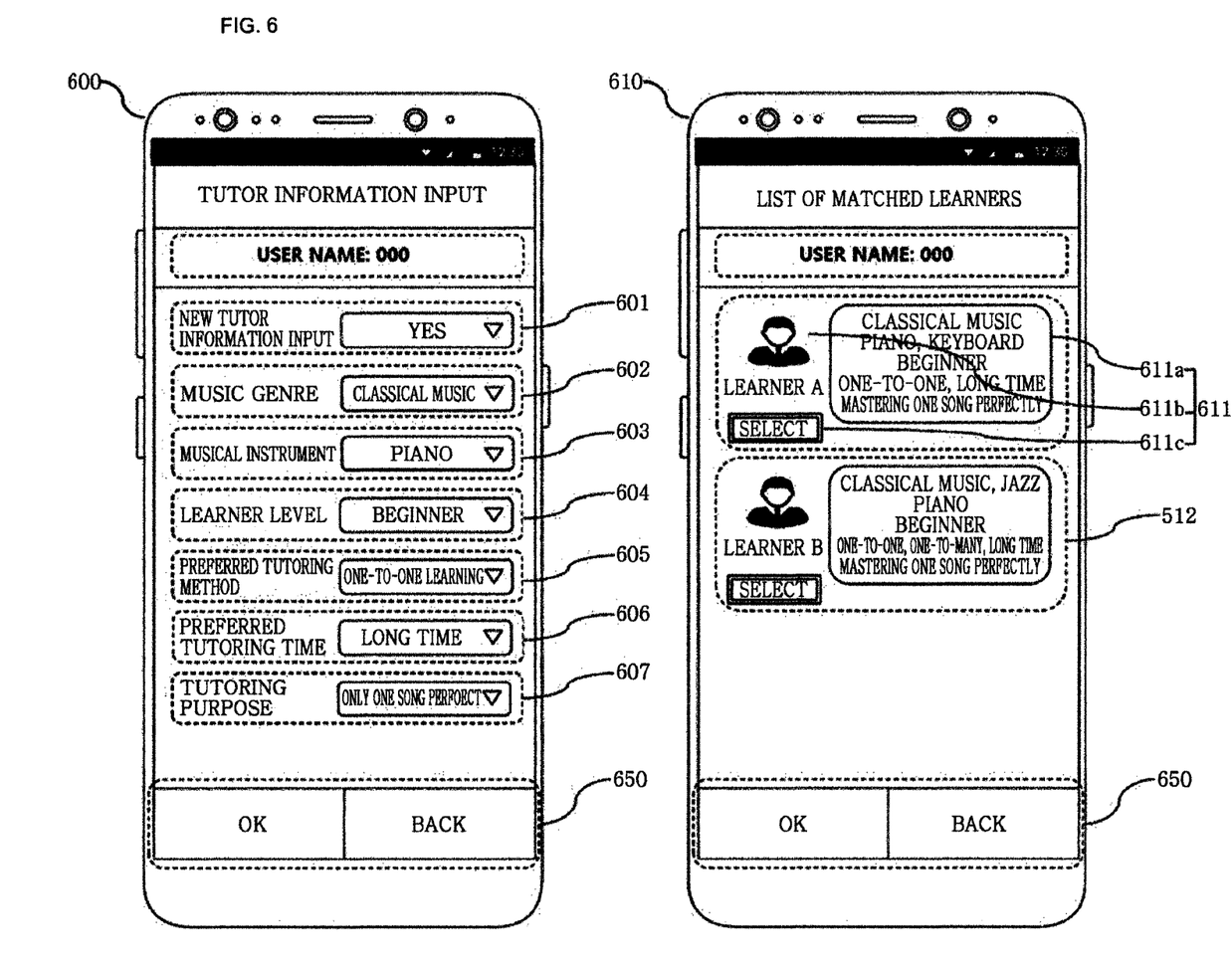
FIG. 6 illustrates a diagram of a tutor information input page and a learner selection page provided to a tutor device in a system for providing an artificial intelligence-based extended reality music tutoring service in accordance with some exemplary embodiments of the present disclosure.

FIG. 6 illustrates a diagram of a tutor information input page 600 and a learner selection page 610 provided to a tutor device in a system for providing an artificial intelligence-based extended reality music tutoring service in accordance with some exemplary embodiments of the present disclosure.

Specifically, the tutor information input page 600 may be provided in step S12. The learner information input page 600 may include an area 601 for selecting whether the tutor directly inputs information, an area 602 for the information on the music genre, an area 603 for the information on the musical instrument, an area 604 for the information on the learner level, an area 605 for the information on the preferred tutoring method, an area 606 for the information on the preferred tutoring time, and an area 607 for the information on the tutoring purpose. When 'YES' is selected in the area 601, the areas 602 to 607 may be directly set by the tutor, and when 'NO' is selected in the area 601, the areas 602 to 607 may be automatically set based on the past tutoring history of the tutor stored in the server S.

Further, the learner selection page 610 may be provided in step S16. For example, the learner selection page 610 may include an area 611 for displaying information about the matched learner, and the area 611 may include an area 611a for displaying information on tutoring that the learner wants to receive, an area 611b for displaying an avatar or photo of the corresponding learner, and a selection area 611c for selecting the corresponding learner. Further, when a plurality of learners are matched, the learner selection page 610 may further include an area 612 for displaying information about the learner.

Figure 7:
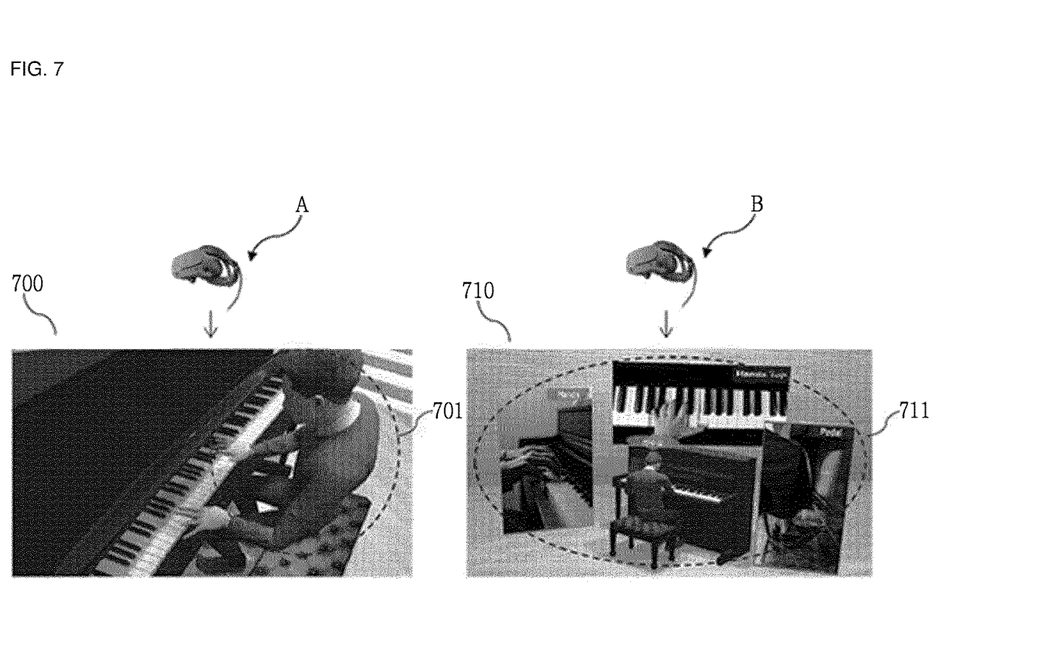
FIG. 7 illustrates examples of extended reality images produced by a learner device and a tutor device while extended reality music tutoring is performed, in a system for providing an artificial intelligence-based extended reality music tutoring service in accordance with some exemplary embodiments.

FIG. 7 illustrates examples of an extended reality image 700 produced by the learner device A and an extended reality image 710 produced by the tutor device B while extended reality music tutoring is performed, in a system for providing an artificial intelligence-based extended reality music tutoring service in accordance with some exemplary embodiments. More specifically, an extended reality image 700 may be produced by the extended reality generating device of the learner device A and displayed on the display, and the extended reality image 700 may be produced so that the tutor avatar 701 appears in a space where the learner actually exists. In addition, the extended reality image 710 may be produced by the extended reality generating device of the tutor device B and displayed on the display, and the extended reality image 710 may be produced so that an expanded reality image 711 including the learner avatar, enlarged images (e.g., hands playing a piano keyboard and a foot stepping on a piano pedal.) of parts of the learner avatar playing that the tutor needs to examine in detail, or the like, appears in a space where the tutor actually exists.

Methods in accordance with the exemplary embodiments described in the claims or specification of the present disclosure may be implemented in the form of hardware, software, or a combination of hardware and software.

Meanwhile, although specific embodiments have been described in the detailed description of the present disclosure, various modifications can be made without departing from the scope of the present disclosure. Therefore, the scope of the present disclosure should not be limited to the described embodiments, but should be defined not only by the claims set forth below but also by equivalents of the claims.

According to the present disclosure, it is possible to resolve spatial constraints, lack of physical infrastructure, and lack of human infrastructure, and enable a learner and a tutor to communicate in real time, by providing a non-face-to-face music tutoring service in an environment close to the real face-to-face education environment through providing the music tutoring service using extended reality technology.

In addition, in the present disclosure, it is also possible to provide a tailored music tutoring service to a learner and a tutor, by matching an optimal tutor who is able to provide a music tutoring that the learner wants, and matching an optimal learner suitable for the music tutoring that the tutor is able to provide.

What is claimed is:

1. A method for providing an artificial intelligence-based extended reality music tutoring service by a system including one or more learner devices, one or more tutor devices, and a server, the method comprising:
   matching, by the server, a learner device and a tutor device for performing extended reality music tutoring, based on learner information transmitted from the one or more learner devices and tutor information transmitted from the one or more tutor devices;
   integrating, by the server, learner environment information transmitted from the matched learner device and tutor environment information transmitted from the matched tutor device;
   generating, by the server, real-time lesson data for tutors based on real-time learner data transmitted from the learner device;
   rendering, by the tutor device, an extended reality image about the learner device interacting with the tutor device on a display of the tutor device, by using the generated real-time lesson data for the tutor;
   generating, by the server, real-time lesson data for learners based on real-time tutor data transmitted from the tutor device; and
   rendering, by the learner device, an extended reality image about the tutor device interacting with the learner device on a display of the learner device, by using the generated real-time lesson data for the learner.

2. The method of claim 1, wherein the learner information includes information on a music genre for which a learner wants to receive tutoring, information on a musical instrument for which the learner wants to receive tutoring, information on a musical instrument playing level of the learner, information on a tutoring method preferred by the learner, information on tutoring time, and information on a tutoring purpose of the learner, and
   the tutor information includes information on a music genre in which a tutor offers tutoring, information on a musical instrument in which the tutor offers tutoring, information on a performance level of a past tutoring target, information on a past tutoring method, information on past tutoring time, and information on a past tutoring purpose.

3. The method of claim 2, wherein the matching of the learner device and the tutor device by the server comprises:
   identifying characteristics of a music tutoring service requested by the learner of the learner device by inputting the learner information about the learner device into a tutor matching model; and
   extracting the tutor device corresponding to the tutor information matching the identified characteristics of the music tutoring service, from among the one or more tutor devices connected to the server, based on the tutor matching model.

4. The method of claim 2, wherein the matching of the learner device and the tutor device by the server comprises:
   identifying characteristics of a music tutoring service that is providable by the tutor of the tutor device by inputting the tutor information about the tutor device into a tutor matching model; and
   extracting the learner device corresponding to the learner information matching the identified characteristics of the music tutoring service, from among the one or more learner devices connected to the server, based on the tutor matching model.

5. The method of claim 3, further comprising:
   transmitting, by the server, a tutor matching result indicating the matched tutor device to the learner device after the learner device and the tutor device are matched;
   determining, by the learner device, to receive the extended reality music tutoring from the matched tutor device; and
   transmitting, by the learner device, a tutor selection message indicating that the matched tutor device has been selected to the server.

6. The method of claim 4, further comprising:
   transmitting, by the server, a learner matching result indicating the matched learner device to the tutor device after the learner device and the tutor device are matched;
   determining, by the tutor device, to provide the extended reality music tutoring to the matched learner device; and
   transmitting, by the tutor device, a learner selection message indicating that the matched learner device has been selected to the server.

7. The method of claim 1, further comprising generating, by the server, initial integrated environment information for learners and initial integrated environment information for tutors based on the integrating of the learner environment information and the tutor environment information,
   wherein the learner environment information includes background information about a first space where the learner is located, location information about the learner in the first space, and location and shape information about a musical instrument to be played by the learner in the first space,
   the tutor environment information includes background information about a second space where the tutor is located, location information about the tutor in the second space, and location and shape information about a musical instrument to be played by the tutor in the second space,
   the initial integrated environment information for learners includes first space-related information to which the tutor environment information is applied based on a tutor avatar image and the learner environment information, and the initial integrated environment information for tutors includes second space-related information to which the learner environment information is applied based on a learner avatar image and the tutor environment information.

8. The method of claim 7, further comprising:

receiving, by the learner device, the initial integrated environment information for learners from the server;

rendering, by the learner device, an extended reality image including the tutor avatar on the display of the learner device by using the initial integrated environment information for learners;

receiving, by the tutor device, the initial integrated environment information for tutors from the server; and rendering, by the tutor device, an extended reality image including the learner avatar on the display of the tutor device by using the initial integrated environment information for tutors.

9. The method of claim 1, wherein the real-time learner data includes voice data input in real time through the learner device, behavior data of the learner, and state data of a musical instrument played by the learner, the generating of the real-time lesson data for tutors includes generating data for expressing an extended reality image in which a learner avatar interacts in real time with a musical instrument played by a tutor in a space where the tutor is located by matching the real-time learner data to the tutor environment information, and the rendering of the extended reality image about the learner device interacting with the tutor device on the display of the tutor device includes rendering the extended reality image in which the learner avatar interacts in real time with the musical instrument played by the tutor on the display of the tutor device.

10. The method of claim 1, wherein the real-time tutor data includes voice data input in real time through the tutor device, behavior data of the tutor, and state data of a musical instrument played by the tutor, the generating of the real-time lesson data for learners includes generating data for expressing an extended reality image in which a tutor avatar interacts in real time with a musical instrument played by a learner in a space where the learner is located by matching the real-time tutor data to the learner environment information, and the rendering of the extended reality image about the tutor device interacting with the learner device on the display of the learner device includes rendering the extended reality image in which the tutor avatar interacts in real time with the musical instrument played by the learner on the display of the learner device.

* * * * *